United States Patent [19]

Ikemura et al.

[11] Patent Number: 4,646,813
[45] Date of Patent: Mar. 3, 1987

[54] MULTIMODE VENTILATOR

[75] Inventors: Akio Ikemura, Kurobe; Minoru Kajiki, Toyama, both of Japan

[73] Assignee: Yoshida Kogyo K.K., Tokyo, Japan

[21] Appl. No.: 753,126

[22] Filed: Jul. 9, 1985

[30] Foreign Application Priority Data

Jul. 10, 1984 [JP] Japan .................. 59-104178[U]

[51] Int. Cl.$^4$ .............................................. F24F 7/08
[52] U.S. Cl. ........................................ 165/54; 165/7; 98/33.1; 98/34.5
[58] Field of Search .............. 165/7, 8, 54, 103; 98/33.1, 34.5, 34.6

[56] References Cited

U.S. PATENT DOCUMENTS 3,977,466  8/1976  Johansson .................. 165/7
4,462,459  7/1984  Schmidlin .................. 165/54

FOREIGN PATENT DOCUMENTS 3006318  8/1981  Fed. Rep. of Germany ........ 165/54
24658    7/1978  Japan .
74443    4/1984  Japan .
2014720  8/1979  United Kingdom .................. 165/54

Primary Examiner—Albert W. Davis, Jr.
Attorney, Agent, or Firm—Hill, Van Santen, Steadman & Simpson

[57] ABSTRACT

A multimode ventilator mounted on a window unit dividing interior and exterior sides from each other has a frame assembly including a central partition on which a heat exchanger is rotatably supported. The frame assembly has first and second inner chambers divided from each other and first and second outer chambers divided from each other. Discharge and supply fans are disposed respectively in the first outer chamber and the second inner chamber. The frame assembly has a first opening for communication between the first inner chamber and the interior, a second opening for communication between the first outer chamber and the exterior, a third opening for communication between the second outer chamber and the exterior, and a fourth opening for communication between the second inner chamber and the interior. The ventilator also has a first damper coupled to the second opening, a second damper mounted on the frame assembly and openable to provide communication between the second inner chamber and the interior side, and a third damper mounted on the central partition and openable to provide communication between the second inner and outer chambers in bypassing relation to the rotor.

5 Claims, 5 Drawing Figures

MULTIMODE VENTILATOR

BACKGROUND OF THE INVENTION

1. Field of the Invention

The present invention relates to a multimode ventilator with a built-in heat exchanger for use on a house wall, a building curtain wall, a window panel, or a similar wall panel.

2. Description of the Prior Art

One known ventilator with a built-in heat exchanger is disclosed in Japanese Laid-Open Patent Publication No. 59-74443 published on Apr. 26, 1984. The disclosed ventilator has a discharge passage for delivering air from an interior side to an exterior side and a supply passage for delivering air from the exterior side to the interior side. A heat transfer takes place between the two air flows as they pass through a rotor which rotates at a low speed in the ventilator.

Japanese Patent Publication No. 53-24658 published on July 21, 1978 reveals a ventilator having bypass passages for discharge and supply passages, respectively. When no heat transfer is necessary between the air-flows through a heat exchanger rotor, the bypass passages are opened to adjust the amounts of air drawn from exterior and interior sides.

The conventional ventilators with the heat exchanger are however incapable of merely discharging foul air from the room and introducing fresh cool air from the exterior for cooling the interior without involving any heat exchange, and also of circulation of air in the room for better air conditioning effects and a more uniform room temperature distribution. Therefore, separate arrangements must be added to the ventilator for cooling the interior with fresh exterior air and for circulating air in the interior.

SUMMARY OF THE INVENTION

In view of the shortcomings of the conventional ventilators, it is an object of the present invention to provide a ventilator having a number of functions or modes capable of ventilation with a heat exchange, air circulation in an interior space or room, and ventilation without a heat exchange.

According to the present invention, a ventilator for attachment to a panel dividing an exterior side and an interior side from each other includes a frame assembly including a central partition on which a heat exchanger rotor is rotatably mounted and which defines first and second inner chambers divided from each other and first and second outer chambers divided from each other. The frame assembly has a first opening for communication between the first inner chamber and the interior, a second opening for communication between the first outer chamber and the exterior, a third opening for communication between the second outer chamber and the exterior, and a fourth opening for communication between the second inner chamber and the interior. The heat exchanger rotor provides communication between the first inner and outer chambers and between the second inner and outer chambers. The ventilator also has a discharge fan disposed in the first outer chamber and having an outlet coupled to the second opening, a supply fan disposed in the second inner chamber and having an outlet coupled to the fourth opening, a first damper coupled to the second opening, a second damper mounted on the frame assembly and openable to provide communiation between the second inner chamber and the interior side, and a third damper mounted on the central partition and openable to provide communication between the second inner and outer chambers in bypassing relation to the rotor.

For ventilation with an exchange of heat, the rotor is rotated, and the discharge and supply fans are driven, with the first damper open and the second and third dampers closed. Air is discharged from the interior side through the first opening, the first inner chamber, the rotor, the first outer chamber, the discharge fan, the second opening, and the first damper into the exterior side. Simultaneously, air is supplied from the exterior side through the third opening, the second outer chamber, the rotor, the second inner chamber, the supply fan, and the fourth opening into the interior side. During this time, a heat transfer occurs between the air-flows in the rotor.

For ventilation without an exchange of heat, the rotor is stopped, and the discharge and supply fans are driven, with the first and third dampers open and the second damper closed. Air is discharged from the interior side through the first opening, the first inner chamber, the rotor, the first outer chamber, the discharge fan, the second opening, and the first damper into the exterior side. Simultaneously, air is supplied from the exterior side through the third opening, the second outer chamber, the third damper and also the rotor, the second inner chamber, the supply fan, and the fourth opening into the interior side. No heat transfer occurs between the air-flows in the rotor because the rotor is at rest.

When air is to be circulated on the interior side, the rotor is stopped, and only the supply fan is driven, with only the second damper open. Air flows from the interior side through the second damper, the second inner chamber, the supply fan, and the fourth opening back into the interior side.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
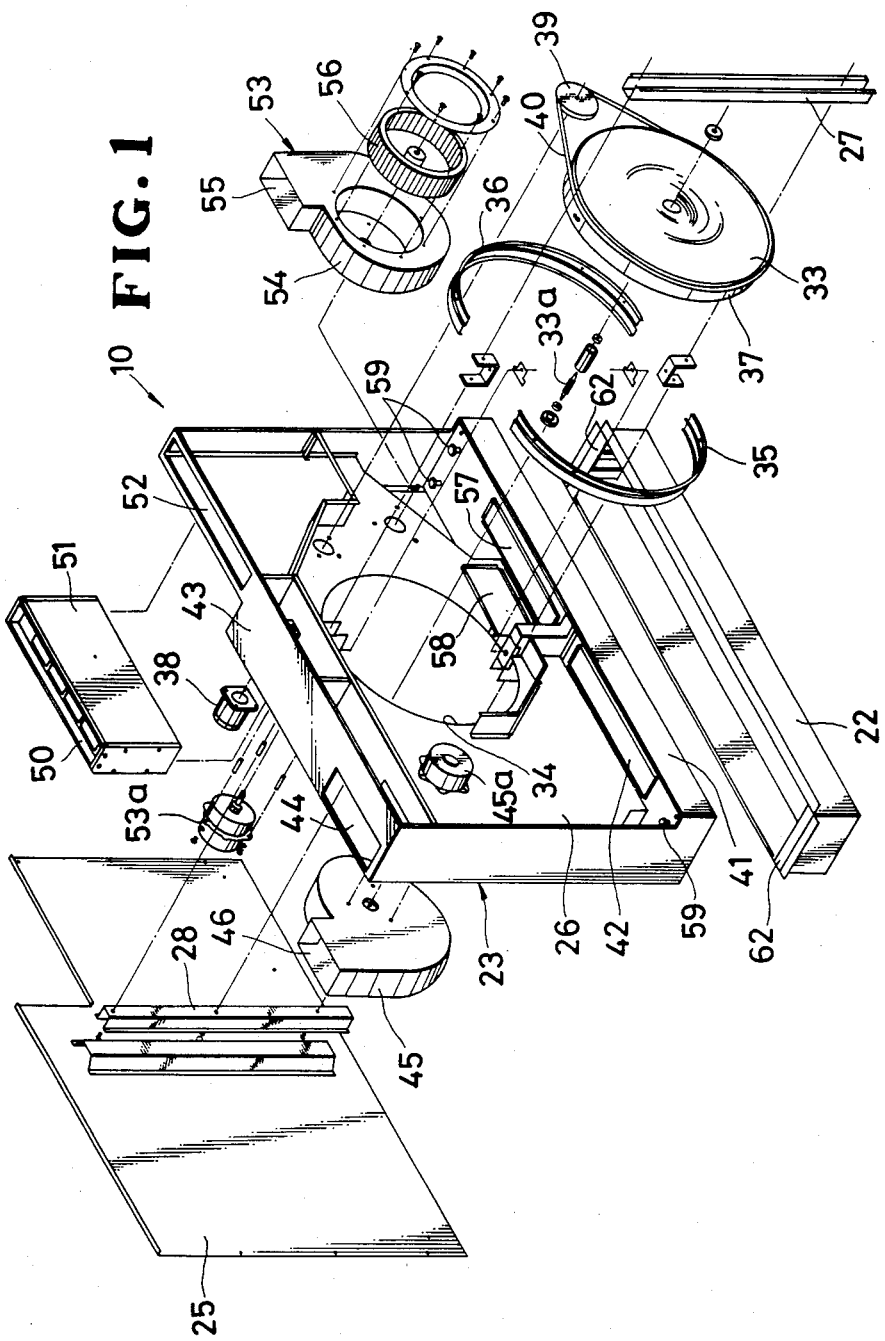
FIG. 1 is an exploded perspective view of a multimode ventilator according to the present invention.
Figure 2:
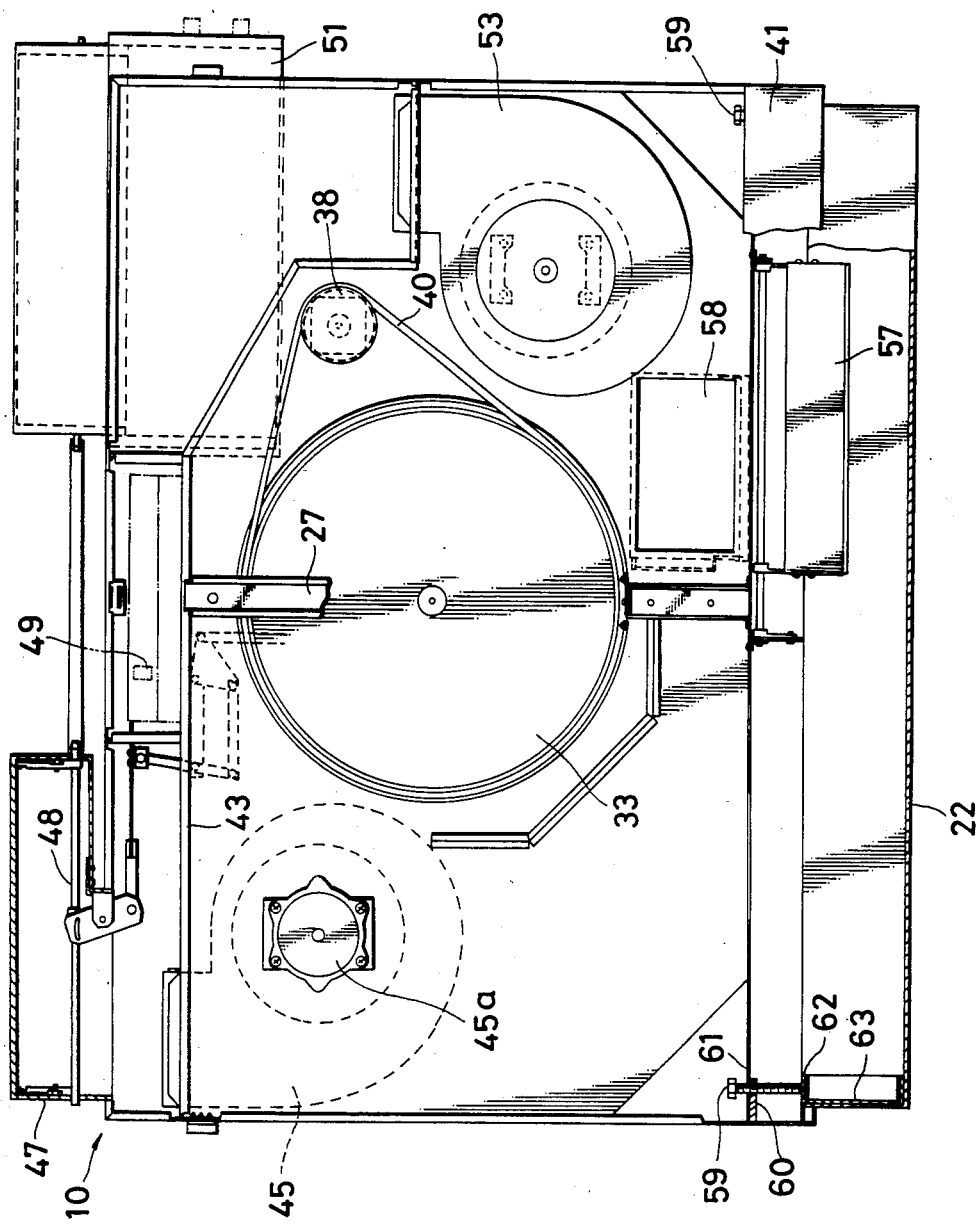
FIG. 2 is a cross-sectional front elevational view of the multimode ventilator.
Figure 3:
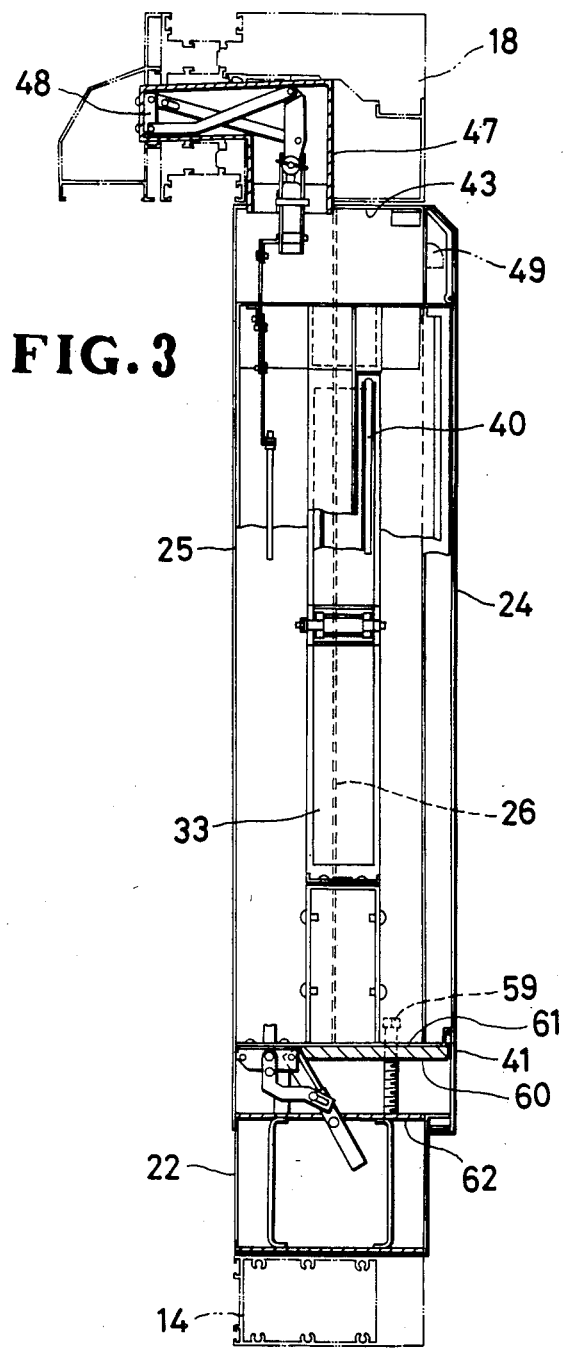
FIG. 3 is a cross-sectional side elevational view of the multimode ventilator.

The principles of the present invention are particularly useful when embodied in a multimode ventilator, generally indicated by the reference numeral 10, as shown in FIGS. 1 through 3.

The multimode ventilator 10 according to the present invention can be mounted on a house wall, building curtain wall, a window panel, or another wall panel of an interior space which is to be ventilated at desired times.

Figure 4:
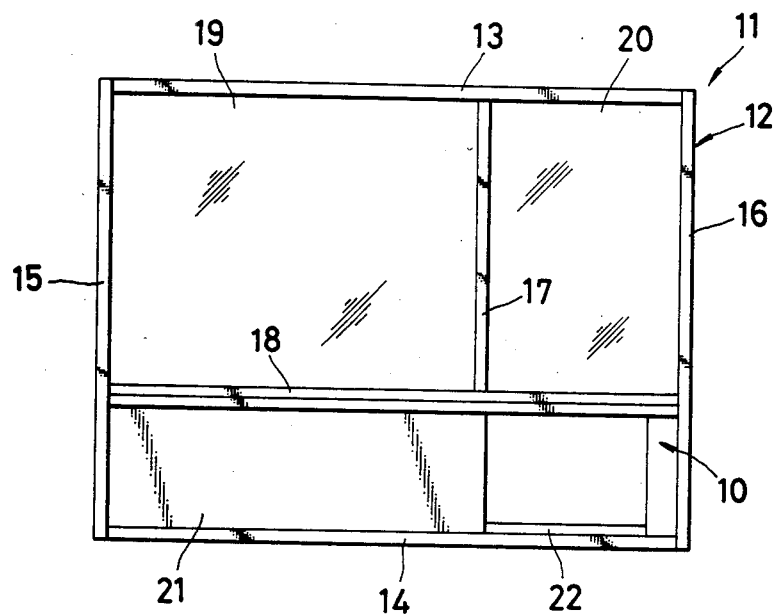
FIG. 4 is a front elevational view of a window unit in which the multimode ventilator is incoporated.

As shown in FIG. 4, the multimode ventilator 10 is assembled in a window unit 11, for example, having a window frame or sash 12. The window frame 12 is composed of a head 13, a sill 14, a pair of side jambs 15, 16, a vertical bar or mullion 17, and a transom 18. The window unit 11 includes glass panes 19, 20 supported by the head 13, the side jambs 15, 16, the mullion 17, and the transom 18. The ventilator 10 is disposed between the transom 18 and the sill 14 in a position beneath the glass pane 20. The window unit 11 also includes a panel 21 disposed between the transom 18 and the sill 14 adjacent to the ventilator 10. The ventilator 10 is supported on a skirt 22 for height adjustment as described later on.

Figure 5:
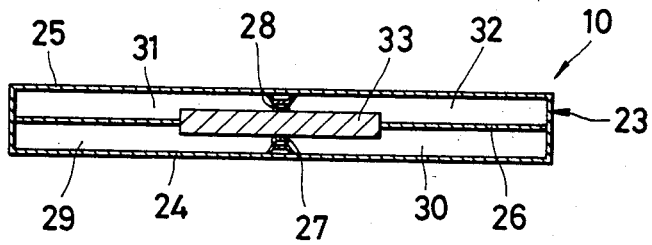
FIG. 5 is a horizontal cross-sectional view of the multimode ventilator.

As schematically illustrated in FIG. 5, the ventilator 10 includes a frame assembly 23 composed of an inner cover panel 24 positioned on the interior side of the window unit 11, an outer cover panel 25 positioned on the exterior side thereof and spaced from the inner cover panel 24, and a central partition 26 disposed between the inner and outer cover panels 24, 25 in parallel relation thereto. The frame assembly 23 also has a pair of inner and outer partitions 27, 28 joined respectively to the inner and outer cover panels 24, 25. These partitions 26, 27, 28 divide the interior space of the frame assembly 23 into a first inner chamber 29, a second inner chamber 30, a first outer chamber 31, and a second outer chamber 32. The inner and outer partitions 27, 28 support a heat exchanger rotor 33 positioned centrally between the chambers 29, 30, 31, 32. In operation, an exchange of heat takes place between an air-flow passing from the first inner chamber 29 into the first outer chamber 31 through a lefthand half (FIG. 5) of the rotor 33 and an air flow passing from the second outer chamber 32 into the second inner chamber 30 through a righthand half (FIG. 5) of the rotor 33. The principles of operation of the heat exchanger rotor 33 are well known in the art and will not be described in detail.

As illustrated in FIGS. 1 through 3, the central partition 26 has a central circular hole 34 in which the rotor 33 is rotatably supported by an axle 33a supported between the inner and outer cover panels 24, 25. A pair of semicircular bearing members 35, 36 is mounted in the central circular hole 34 along its inner edge, each bearing member 35, 36 having a labyrinth packing (not shown) which fills up the gap between the periphery of the rotor 33 and the central partition 26. The rotor 33 includes an outer circular frame 37. A motor 38 mounted on the central partition 26 is coupled to a pulley 39. In operation, the rotor 33 is rotated at a relatively low speed by the motor 38 through an endless belt 40 trained around the outer circular frame 37 and the pulley 39.

The central partition 26 is coupled to a lower horizontal frame member 41 having a first opening 42 positioned at the bottom of the first inner chamber 29 and opening thereinto, the first opening 42 communicating with the interior side of the window unit 11 through the skirt 22 and the sill 14 (FIG. 4). The central partition 26 is also joined to an upper horizontal frame member 43 having a second opening 44 positioned at the top of the first outer chamber 31 and opening thereinto. A discharge fan 45 is disposed in the first outer chamber 31 and has an outlet 46 coupled to the second opening 44, which communicates with the exterior side of the window unit 11 through a duct 47 (FIG. 3) mounted in the transom 18. The discharge fan 45 is driven by a motor 45a mounted on the central partition 26. Therefore, air from the interior side of the window unit 11 is discharged into the exterior side thereof by the discharge fan 45 through the first inner chamber 29, the rotor 33, the first outer chamber 31, the discharge fan 45, the second opening 44, and the duct 47. The duct 47 accommodates therein a first damper 48 which is openable and closable by a switch 49 mounted on the upper frame member 43. The first damper 48 is closed when the ventilator 10 is shut off or when air is circulated in the interior side of the window unit 11.

A third opening 50 defined in a heat-exchanging unit 51 supported on the frame assembly 23 and disposed in the upper portion of the second outer chamber 32 communicates with the second outer chamber 32. The heat-exchanging unit 51 serves to warm air introduced from the exterior side in advance of passage thereof through the rotor 33 when the interior side is warmed, or to precool air introduced from the exterior side prior to the passage through the rotor 33 when the interior side is cooled. However, the heat-exchanging unit 51 may be dispensed with, and the third opening 50 may be defined directly in the upper frame member 43.

The upper frame member 43 has a fourth opening 52 communicating with the interior side of the window unit 11 through the transom 18. A supply fan 53 disposed in the second inner chamber 30 is composed of a scroll 54 having an outlet 55 coupled to the fourth opening 52 and an impeller 56 rotatably disposed in the scroll 54. The supply fan 53 is driven by a motor 53a mounted on the central partition 26. Air can be introduced from the exterior side of the window unit 11 by the supply fan 53, such air passing through the third opening 50, the second outer chamber 32, the rotor 33, the second inner chamber 30, the supply fan 53, the fourth opening 52, and the transom 18.

The lower frame member 41 supports thereon a second damper 57 disposed at the bottom of the second inner chamber 30, the second damper 57 being openable to provide communication between the second inner chamber 30 and the interior side through the skirt 22 and the sill 14. When air is circulated through the interior side of the window unit 11 for a uniform room temperature, the second damper 57 is open and the supply fan 53 is operated to draw the air into the second inner chamber 30 through the sill 14, the skirt 22, and the second damper 57, and then to return the air from the second inner chamber 30 into the interior side through the fourth opening 52.

The central partition 26 supports thereon a third damper 58 openable for communication between the second inner and outer chambers 30, 32 in bypassing relation to the rotor 33. When the damper 58 is open and the supply fan 53 is driven, air drawn from the exterior side through the third opening 50 is delivered from the second outer chamber 32 directly into the second inner chamber 30 through the damper 58, and then supplied by the supply fan 53 into the interior side through the fourth opening 52. At this time, part of the air passes through the rotor 33 that is held at rest. Therefore, fresh air can be supplied from the exterior side into the interior side without involving a heat transfer between air-flows in the rotor 33.

A set of height adjustment screws 59 are threaded through the four corners of the lower frame member 41 and through a set of back plates 60 fixed to the lower surface of an upper wall 61 of the lower frame member 41. The screws 59 have their distal ends held against the upper surfaces of upper flanges 62 of channel-shaped reinforcements 63 disposed in the skirt 22. The ventilator 10 can be raised with respect to the transom 18 or the sill 14 by turning the screws 59 in a direction to displace them into the lower frame member 41, and can be lowered by turning the screws 59 in the opposite direction.

The ventilator 10 can operate in various modes as described below.

(i) For shutting off the ventilator 10:
First damper 48: closed
Second damper 57: open
Third damper 58: closed
Rotor 33: stopped
Discharge fan 45: stopped
Supply fan 53: stopped The second damper 57 is kept open in order to prevent the ventilator 10 from becoming frosted or frozen in winter so that the ventilator 10 can immediately be operated for air circulation in winter mornings.

(ii) For air circulation on the interior side:
First damper 48: closed
Second damper 57: open
Third damper 58: closed
Rotor 33: stopped
Discharge fan 45: stopped
Supply fan 53: driven Air flows from the interior side past the second damper 57, and through the second inner chamber 30, the supply fan 53, and the fourth opening 52 back into the interior side.

(iii) For ventilation with an exchange of heat:
First damper 48: open
Second damper 57: closed
Third damper 58: closed
Rotor 33: driven
Discharge fan 45: driven
Supply fan 53: driven Air is discharged from the interior side through the first opening 42, the first inner chamber 29, the rotor 33, the first outer chamber 31, the discharge fan 45, the second opening 44, and past the first damper 48 into the exterior side. At the same time, air is supplied from the exterior side through the third opening 50, the second outer chamber 32, the rotor 33, the second inner chamber 30, the supply fan 53, and the fourth opening 52 into the interior side. A heat transfer occurs between the air-flows in the rotor 33.

(iv) For ventilation without an exchange of heat:
First damper 48: open
Second damper 57: closed
Third damper 58: open
Rotor 33: stopped
Discharge fan 45: driven
Supply fan 53: driven Air is discharged from the interior side through the first opening 42, the first inner chamber 29, the rotor 33, the first outer chamber 31, the discharge fan 45, the second opening 44, and past the first damper 48 into the exterior side. At the same time, air is supplied from the exterior side through the third opening 50, the second outer chamber 32, past the third damper 58 (and partly through the rotor 33), and through the second inner chamber 30, the supply fan 53, and the fourth opening 52 into the interior side. No heat transfer occurs between the air-flows in the rotor 33 since the rotor 33 is now at rest. The ventilator 10 is operated in this mode when cooling the interior side with fresh cool air from the exterior side during the spring or fall.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A ventilator for attachment to a panel dividing an exterior side and an interior side of a building from each other, comprising:

(a) a frame assembly having spaced inner and outer panels, a central partition disposed between said panels, and inner and outer partitions respectively connecting said inner and outer panels to said central partition and thereby defining first and second inner chambers divided from each other and first and second outer chambers divided from each other, said central partition having a central opening leading to each of said chambers, said frame assembly having a first opening for communication between said first inner chamber and the interior of the building , a second opening for communication between said first outer chamber and the exterior, a third opening for communication between said second outer chamber and the exterior, and a fourth opening for communication between said inner chamber and the interior of the building;

(b) a heat exchange rotor rotatably mounted in said circular opening and providing communication between said first and second outer chambers and between said second inner and outer chambers;

(c) a discharge fan disposed in said first outer chamber and having an outlet coupled to said second opening;

(d) a supply fan disposed in said second inner chamber and having an outlet coupled to said fourth opening;

(e) a first damper coupled to said second opening;

(f) a second damper mounted on said frame assembly and openable to enable a fifth opening to provide communication between said second inner chamber and the interior side; and (g) a third damper mounted on said central partition and openable to enable a sixth opening in said central partition to provide communication between said second inner and outer chambers in bypassing relation to said rotor.

2. A ventilator according to claim 1, said frame assembly including a lower frame member joined to said central partition, said first opening being defined in said lower frame member at the bottom of said first inner chamber, said second damper being supported on said lower frame member at the bottom of said second inner chamber.

3. A ventilator according to claim 1, said frame assembly including an upper frame member joined to said central partition, said second opening being defined in said upper frame member at the top of said first outer chamber, said fourth opening being defined in said upper frame member at the top of said second inner chamber.

4. A ventilator according to claim 1, including an heat-exchanging unit supported on said frame assembly and disposed in said second outer chamber, said third opening communicating with said second outer chamber through said heat-exchanging unit.

5. A multimode ventilator according to claim 1, operable to recirculate interior air without heat exchange, said heat exchanger rotor being selectively stoppable, said supply fan being selectably solely energizable, and said second damper being openable with aid first and third dampers closed.

* * * * *